Patented May 7, 1946

2,399,822

UNITED STATES PATENT OFFICE 2,399,822

GANG RIPSAW

William G. Norton, Memphis, Tenn.

Application September 18, 1943, Serial No. 502,915

5 Claims. (Cl. 143—35)

This invention relates to a gang saw for ripping boards into strips and is primarily designed for cutting boards into strips of rectangular cross section, ordinarily square, and such as are later shaped into dowels, broom handles, and various molding strips, such work heretofore having largely been done by cutting individual strips from the edge of a board.

The objects of the invention are:

To make a simple, rugged and efficient machine for accomplishing this purpose.

A further object is to make a machine which automatically feeds the board to the saws and in which travel of the board toward the saws is not only effected, but complete movement of the board throughout its entire length to the saws is completed by the feed mechanism of the machine, and the strips are removed.

A further object is to improve the various details of design and construction of the machine.

The means by which these and other objects are accomplished, and the method of their accomplishment, will readily be understood from the following specification upon reference to the accompanying drawings, in which.

Figure 1:
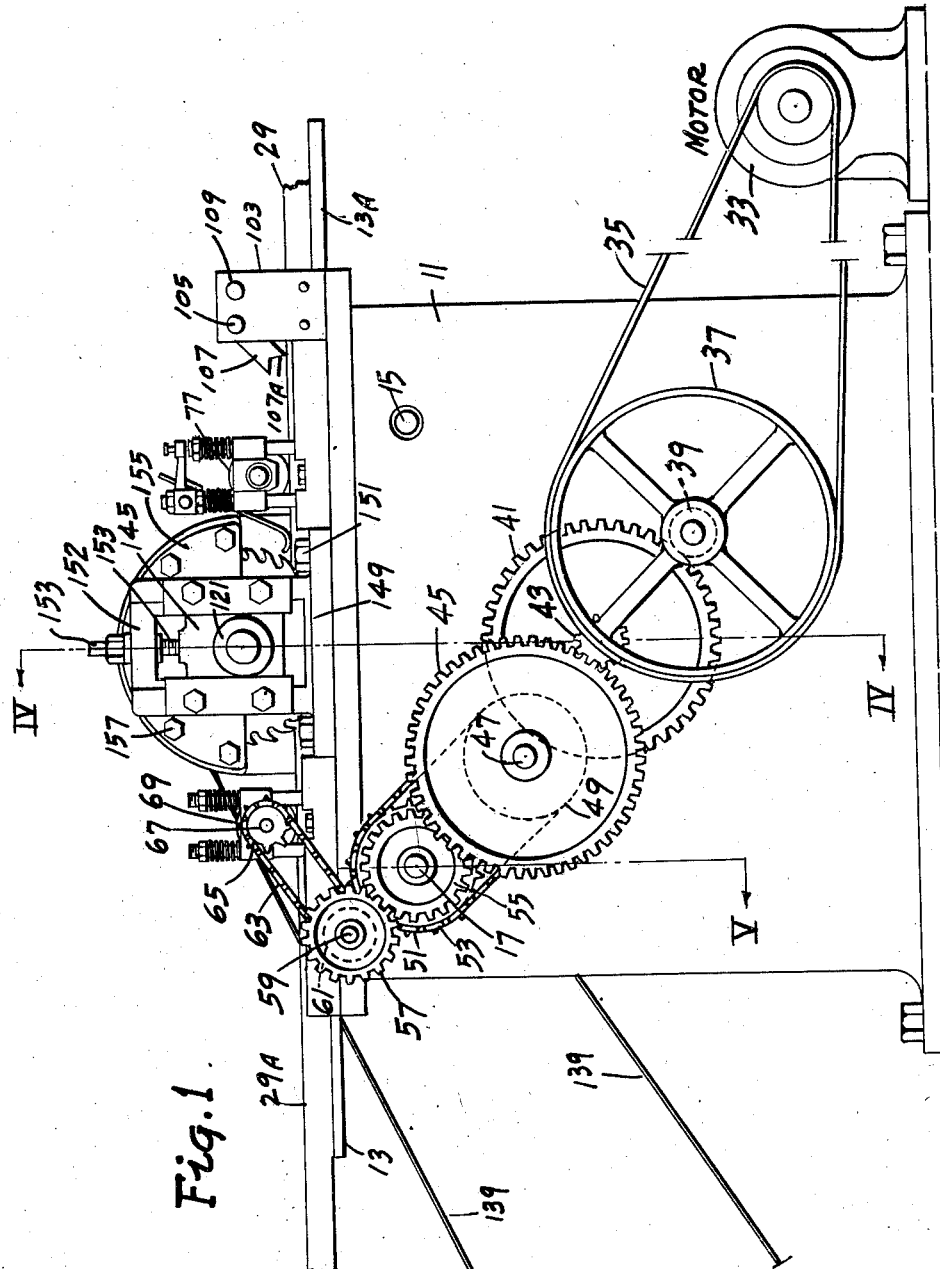
Fig. 1 is a side elevation of the machine showing the feed table and roll drives.
Figure 4:
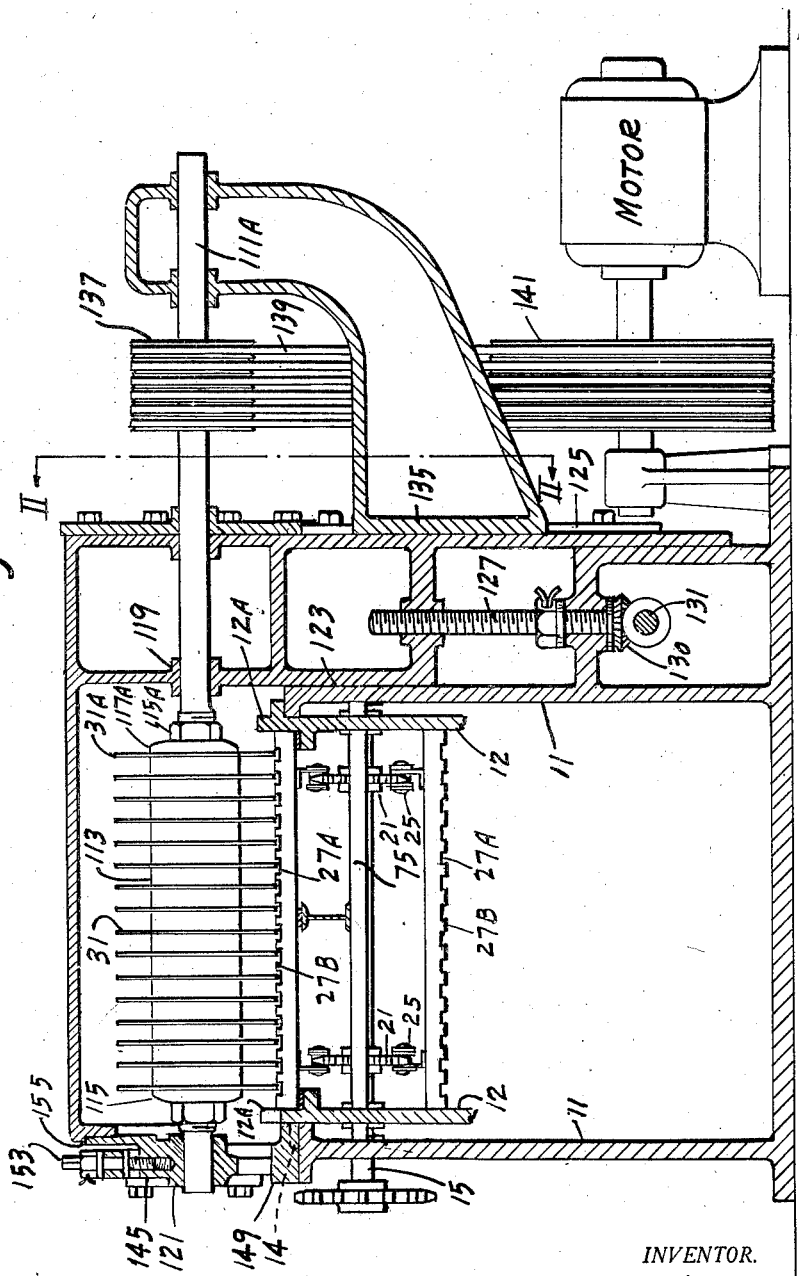
Fig. 4 is a transverse section of the machine taken on the line IV—IV of Fig. 1.

Referring now to the drawings in which the various parts are indicated by numerals:

11 is a frame or base, which is here shown as carrying a secondary frame, which might as well be integral with the main base, and which in any event is rigidly secured to and supported thereby, this latter frame including side members 12 (Fig. 4), and transverse table portions 13, 14 which overlie the sides of the base, to accomplish the support of the side members.

Figure 6:
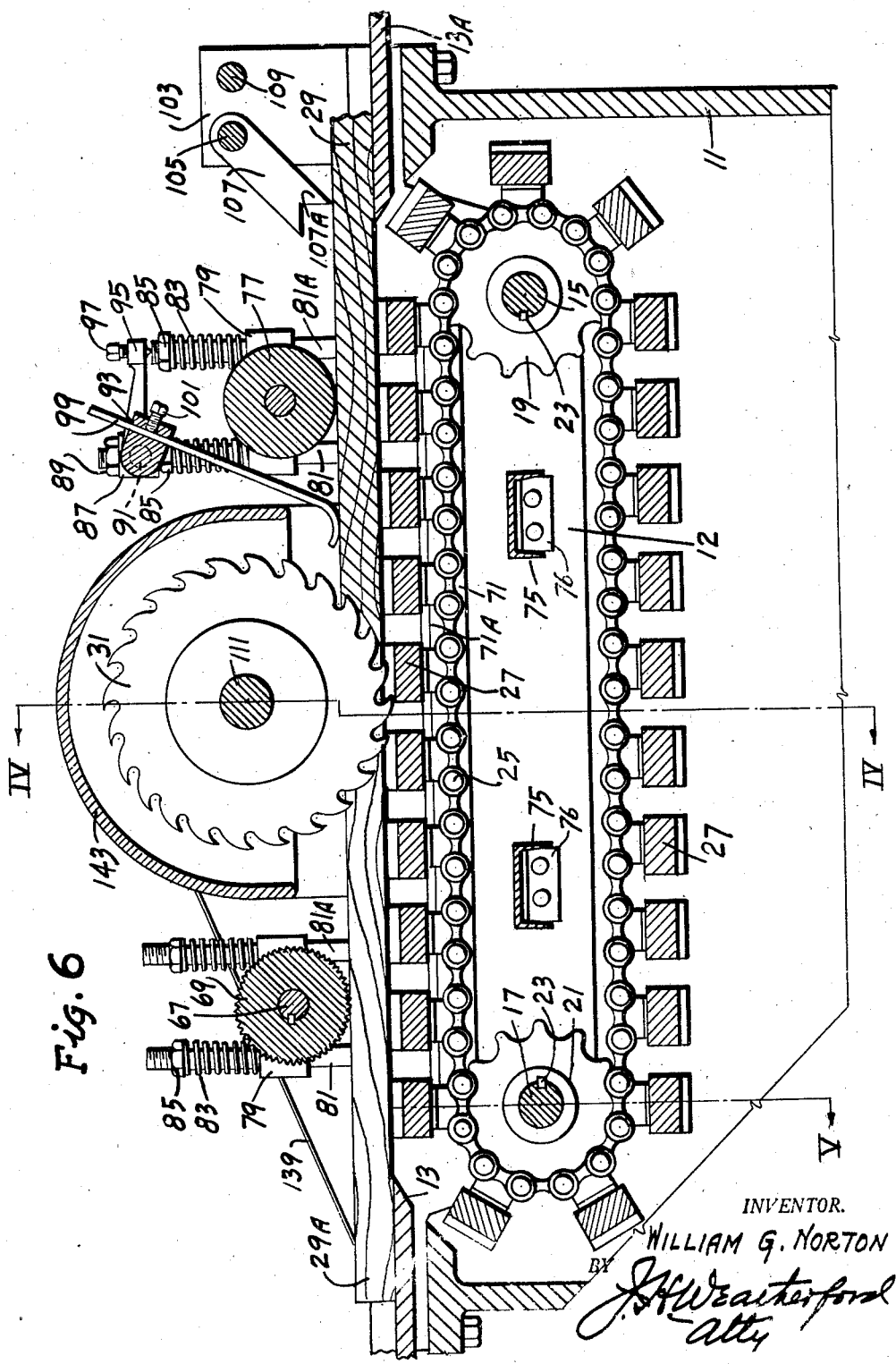
Fig. 6 is a similarly enlarged longitudinal section taken on the line VI—VI of Fig. 5.

Journaled in the side members 12 of the frame are shafts 15, 17 which respectively carry pulleys 19, 21, in pairs, the pulleys being secured to the shafts by keys 23. See Fig. 6. Mounted on the sprocket pulleys 19 and 21 are endless chain belts 25, carrying cross bars 27 which form a traveling bed for traversing the plank 29 to and past the saws and removing the separated strips 29A of the plank from the machine.

Figure 5:
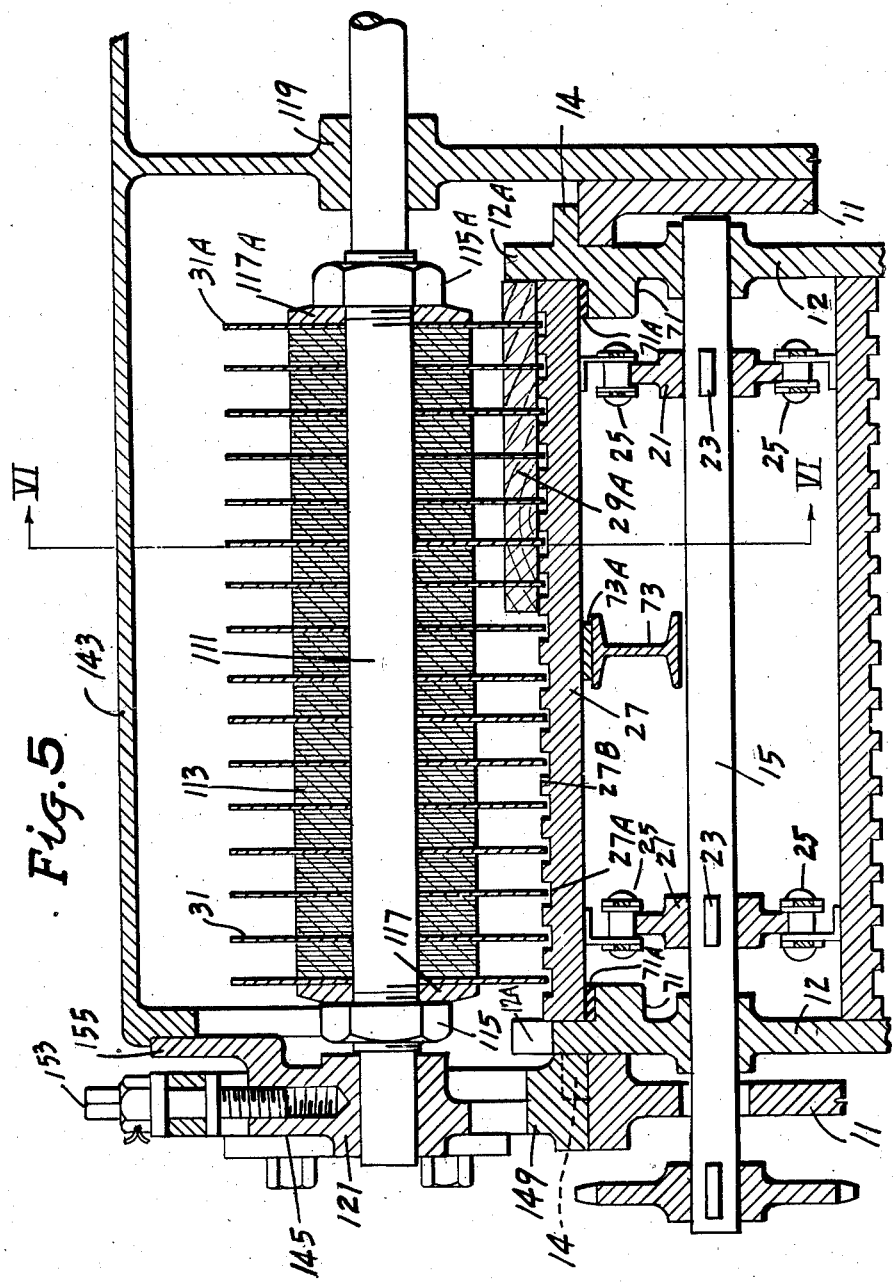
Fig. 5 is an enlarged transverse section taken on the off-set line IV—V of Fig. 6; and the similarly off-set line IV—V of Fig. 1.

These cross bars 27 are provided with uniformly spaced notches 27A (Fig. 5) into which the saws 31 project, there being left between the notches upstanding portions 27B on which the underside of the plank 29, and of the strips 29A cut therefrom, are supported.

The shaft 17 is suitably driven, as by a motor 33, through reduction gearing (Fig. 1) which may comprise a belt 35, pulley 37 and intermediate pinions and gears 39, 41; and 43, 45. The gear 45 may be mounted and secured on a shaft 47, on which is also mounted and secured a sprocket 49 which, through a chain drive 51, drives a second sprocket 53 mounted on and secured to the shaft 17. Also mounted on the shaft 17 is a gear 55 which, through a gear 57, drives a shaft 59, on which is also mounted and secured a sprocket 61. Sprocket 61, through a chain 63, and sprocket 65 drives a cross shaft 67, on which is mounted a toothed or corrugated roll 69 which cooperates with the traveling bed to accomplish the removal of the strips 29A from the machine, the gears 55 and 57 and the sprockets 61 and 65, through the chain 63, coordinating the speed of the roll to the speed of the traveling bed.

The bars 27 of the traveling bed extend laterally from side frame 12 to side frame 12 and at their ends are supported on longitudinal ledges 71, preferably through interposed wear plates 71A, as of brass. See Fig. 5. Centrally the bars are supported by a longitudinally disposed support 73, which may be an I beam, and which is also preferably faced with a wear plate 73A, the beam 73 being supported by transverse supports 75 (Fig. 6) which extend from side frame to side frame and are supported as by lugs 76 extending therefrom. Preferably the side frames have integral portion 12A extending above the level of the bars 27 to form guides for the plank 29A.

Cooperating with the traveling bed, in addition to roll 69, is a second roll 77 (Fig. 1) which may be mounted on a shaft 78 and may be a smooth roll. The shafts 67 and 78 carrying the rolls 69, 77 are journaled at their opposite ends in heads 79, each of which respectively is slidably carried by a pair of vertically disposed posts 81, 81A, the rolls being held down against the plank at desired tension by compression springs 83 bearing against the heads and which may be tightened or loosened by adjustment of nuts 85, 85A suitably threaded on the posts. The posts 81A of the roller 77 additionally carry above the nut 85A blocks 87 which are clamped between nuts 89 and the nuts 85A and journal the opposite ends of a rocker bar 91. See Fig. 6. Adjacent its opposite ends the rocker bar is provided with integral arms 95 which extend to overlie the top of the posts 81A and may be adjusted relatively thereto by set screws 97. The rocker bar carries a plurality of presser fingers 99 suitably clamped by set screws 101, which fingers extend downward and may be adjusted into contact with the top of the plank 29 which is to be gripped, the tension of these fingers against the surface of the plank being adjusted by the set screws 97.

103 are members, secured to and extending upwardly from the frame side members 12, which carry a transverse rod 105 on which are loosely swung a plurality of kick-back detents which are of length to incline downwardly from the bar 103 toward the roll 77, these detents having sharpened points 107A which are adapted to dig into the plank 29 and prevent undesired reverse movement of the plank should the saw thrust, momentarily or otherwise, through any unforeseen happening, be greater than the forward pull of the traveling bed.

109 is an auxiliary cross bar against which the detents may be turned when their use is not desired.

Disposed substantially centrally between the rolls 69 and 77 is a saw arbor 111 on which the saws 31 are mounted, the saws corresponding in number to the notches 27A of the bars 27 and being spaced apart at equal intervals by collars 113 which may be solid or laminated, as may be desired. See Figs. 4 and 5. At the opposite ends of the arbor the saws are clamped by nuts 115, 115A through end collars 117, 117A, nuts preferably being used at both ends in order that adjustment of the bank of saws, relatively to the notches, may be made.

It will be noted, however, that the notches 27A are considerably wider than the thickness of the saws so that it is possible to make slight adjustments of the saw spacing by beginning at the center of the arbor and increasing the spacing toward the ends as by adding an additional thin shim to each of the collars 113, and at an even greater variation in saw spacing, may be made by considering the saws on the arbor as in two banks and varying the spacing of each bank without consideration of the central space between the two banks of saws.

It will be understood, however, that under usual circumstances it is contemplated where changes in saw spacings are to be made, that the entire traveling bed will be replaced with a bed having bars in which the notch spacing corresponds to the desired saw spacing.

Figure 2:
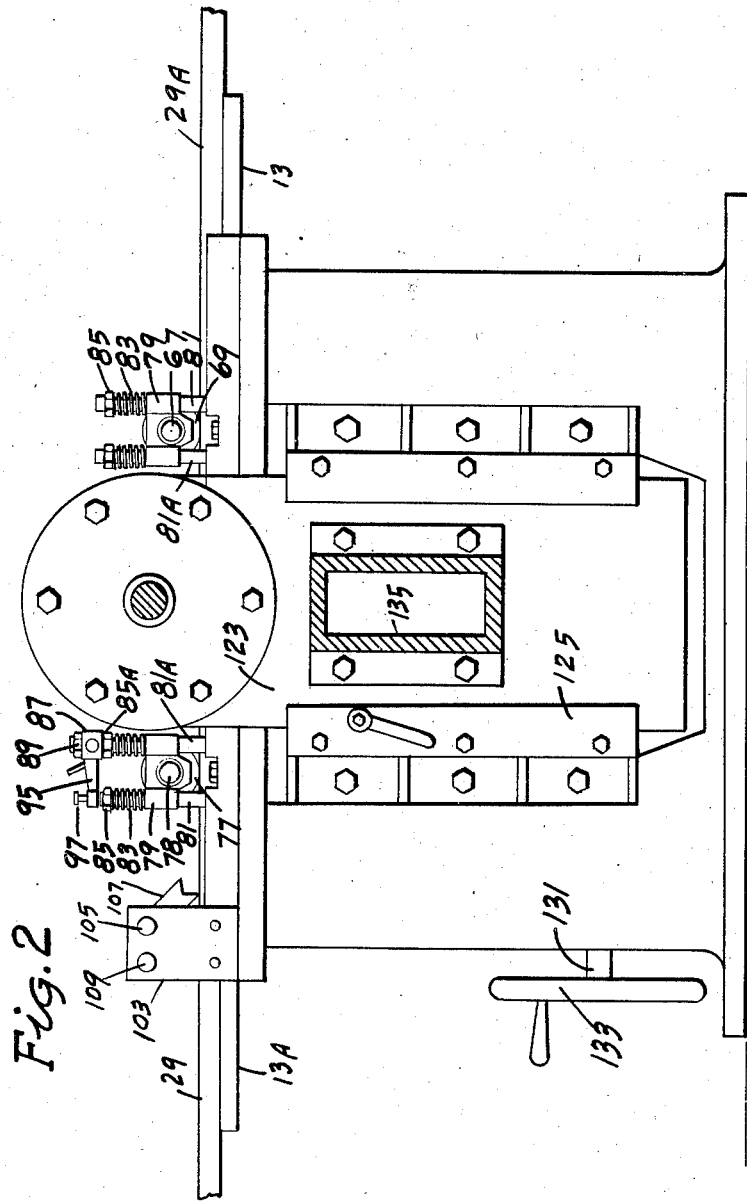
Fig. 2 is the opposite side elevation with the driving motor, pulley and belt cut away, as on the line II—II of Figs. 3 and 4.
Figure 3:
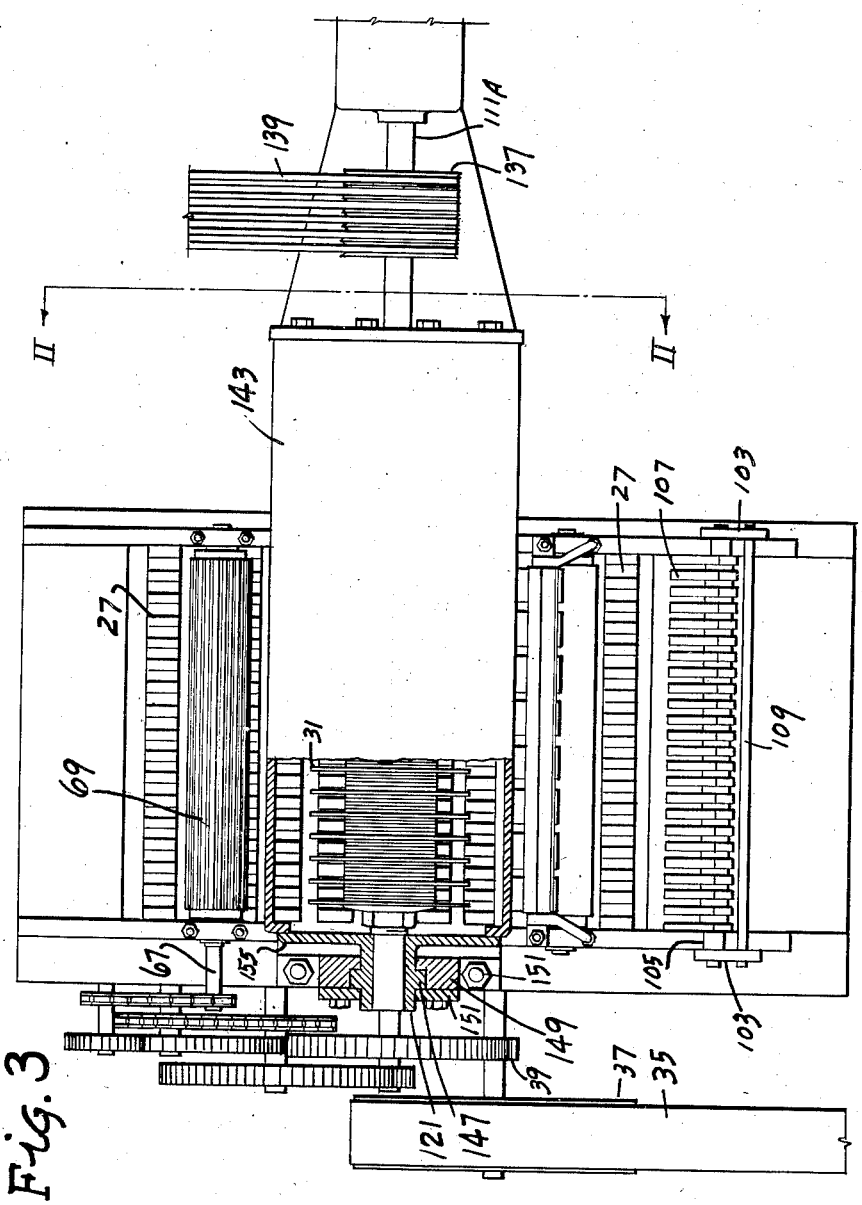
Fig. 3 is a plan with a portion of the saw cover broken away.

The saw arbor 111 is journalled at its opposite ends in bearings 119 and 121, the bearing 119 forming part of an arbor frame 123 (Fig. 4) which is slidably mounted in and guided by suitable guideways 125 (Fig. 2), and which may be raised and lowered by a screw 127, the screw being turned through bevel gears 130 and a shaft 131 (Fig. 4), by a hand wheel 133 (Fig. 2). Secured to the arbor frame is an outboard bracket 135 which carries bearings journalling the outer end 111A of the arbor. Mounted on the arbor is a belt pulley 137 (Figs. 3 and 4) which is driven through suitable belts 139, preferably of V type, from a motor driven pulley 141. The arbor frame 123 preferably carries an integral saw guard 143 which overlies and shields the bank of saws.

The bearing 121 is carried by a head 145 which has laterally extending wing portions 147 (Fig. 3), vertically slidable in conforming guideways in a pedestal 149. Pedestal 149 is removably secured to the base 11 by bolts or cap screws 151 and extends upwardly therefrom, and above the head 145 has a cross portion 152 (Fig. 1) in which is turnably mounted a non-rising screw 153. Screw 153 is threaded into the head 145 and is turned to raise or lower the head and adjust the height of the bearing 121. If desired, the head 145 may integrally carry a disc portion 155 (Figs. 1 and 5) which forms a closure for the open end of the saw guard 143 and is secured to it, as by cap screws 157.

In setting up the machine for use, a traveling bed is installed having cross bars 27 provided with notches 27A conforming in spacing to the desired spacing of the saws 31 along the arbor 111. The cap screws 151 are removed, freeing the pedestal and allowing the pedestal and head carried thereby to be removed from the end of the saw arbor 111.

The arbor frame 123 is raised by the screw 127 high enough to allow the saws which are to be used to clear the tops of the cross bars 27. The first saw 31A (Fig. 5) is placed on the arbor and shifted against the end collar 117A, and the nut 115A is adjusted until the saw 31A is directly over the corresponding notch 27A in the cross bars and at the proper saw spacing from the adjacent frame 12, and thereafter alternate spacing collars 113, of proper thickness, and saws 31 are placed on the arbor until the bank of saws is completed, after which the end collar 117 and nut 115 are placed and the nut 115 tightened. The arbor frame is then lowered until the saws have the proper cutting relation to the bars of the traveling bed.

The bearing 121 is slipped to place on the outer end of the arbor 111 and together with the pedestal 149, in which the bearing is mounted, is slid to place with the pedestal over that portion of the base 11 by which it is carried. The adjusting screw 153 is turned, lowering the pedestal 149 to its seat on the base 11 and the cap screws 151 put in place and tightened and thereafter the screw 153 is further adjusted, usually by reversely turning it, to center the bearing 121 in alinement with the bearing 119 and take the supporting strain off the arbor 111. If the head 145 which carries the bearing also carries a flange 155, which forms an end closure for the saw guard 143, the securing bolts 157 are placed and the head additionally secured to the saw guard.

After the machine has been set up and used until the saws become dull, the pedestal 149, carrying the bearing 121, may be removed giving access to the end of the saw arbor 111, the nut 115 removed and the saws taken off, sharpened and then replaced. After replacement, if the reduction in diameter of the saws should so require, the bearing 121 may be adjusted downward with regard to the pedestal and the arbor frame 123 similarly adjusted.

In using the device, a plank of desired thickness, as the plank 29, is fed in by hand raising the detent fingers as it is slipped under them and until the end of the plank strikes the roll 77, the traveling bed thereafter cooperating with the push exerted on the plank by the workman to carry the plank under the roll and forward against the saws. Planks of various widths may of course be fed in, the planks being guided as they are fed in against one or the other side frames 12. If the planks are comparatively narrow, a second plank, not shown, may be fed in on the opposite side of the machine immediately and guided by the opposite side frame, and otherwise, irrespective of the width of the plank, the second plank may be fed in as movement of the first past the saws permits.

Planks are carried by the traveling bed and cooperating roll 77, against the saws and are thereby ripped into strips of such width as the spacing of the saws accomplishes. Strips which are to be finished into rounds are cut out from planks of the same thickness as the saw spacing so that square strips are practical, but to produce rectangular strips, planks may be of greater or less thickness than saw spacing. As the planks are separated into the strips 29A and these strips progress sufficiently, they are engaged by the roll 69, and such roll, cooperating with the traveling bed, exerts additional pull which eliminates any necessity of further attention by the workman who has fed the plank in.

During the ripping operation, the detents 103 engage the plank should the pull of the bed and the pressure exerted by the workman on the plank be insufficient to accomplish forward movement and prevent kickout of the plank. The presser fingers 99 hold the plank down against the traveling bed as the end of the plank approaches the saw, and also hold the opposite end of the plank after it has passed from beneath the roll 77.

I claim:

1. A gang saw including a base, sawing means, and a traveling bed for supporting and feeding material to and past said sawing means; said sawing means including an arbor, a bank of saws secured thereon, and means for journalling said saws, said journalling means including a frame adjustably mounted on said base for movement perpendicular to said bed, a pair of bearings carried by said frame and spaced apart for journalling one end of said arbor, an arm rigidly carried by said frame and cantilevered therefrom across said bed, a bearing removably carried by the cantilevered end of said arm journalling the outer end of said arbor beyond said saws, and means for adjusting said frame relatively to said base to vary the spacing of said saw arbor from said base.

2. A gang saw in accordance with claim 1, in which said arm is hollow and of arcuate cross section disposed to overlie and house the top and sides of said saws.

3. A gang saw including a base, sawing means and a traveling bed for supporting and feeding material to and past said sawing means; said sawing means including an arbor, a bank of saws removably secured thereon, and means for journalling said saws, said journalling means including a frame adjustably mounted on said base for movement perpendicular to said bed, a pair of bearings carried by said frame and spaced apart for journalling one end of said arbor, an arm rigidly carried by said frame and cantilevered therefrom across said bed, said arm being hollow and of arcuate cross section to overlie and house the top and sides of said saws, means secured to the outer end of said arm forming a bearing for the cantilevered end of said arbor, and forming a closure for the outer end of said housing, said means being removable to permit access to and removal of said saws, and means for adjusting said frame relatively to said base to adjust the spacing of said arbor from said base.

4. A gang saw, including a base, sawing means and a movable bed for supporting and feeding material to and past said sawing means; said sawing means including a saw arbor disposed transversely to the line of feed of said material and thereabove, a bank of saws on said arbor frame, a spaced pair of bearings thereby, for journalling said arbor at one side of said bed, and cantilevering said arbor across said bed in parallelism with the top thereof, means driving said journalled end of said arbor, said frame including a rigid saw guard of arcuate cross section overlying and housing said saws and extending past the opposite end of said bank of saws, said guard having an open end of greater diameter than said saws, means mounting said frame along one side of said base for vertical adjustment toward and away from said bed, means for accomplishing said adjustment; a bearing journalling the cantilevered end of said arbor, and including an integral flange adapted to abut the open end of said guard, a guide bracket mounting said bearing for vertical adjustment, means carried by said bracket for accomplishing said adjustment, means for detachably securing said bracket to the other side of said base, whereby removal of said bracket with the parts carried thereby may be made and free access be had to said arbor for removal and replacement of said saws.

5. A gang saw including a base, sawing means and a traveling bed for supporting and feeding material to and past said sawing means; said sawing means including an arbor, a bank of saws removably secured thereon, and means for journalling said saws, said journalling means including a frame, adjustably mounted on said base for movement perpendicular to said bed, a pair of bearings carried by said frame and spaced apart for journalling one end of said arbor, an arm rigidly carried by said frame and cantilevered therefrom across said bed, a bearing carried by the cantilevered end of said arm journalling the outer end of said arbor beyond said saws, means for adjusting said frame relatively to said base to adjust the spacing of said arbor from said bed, and adjustable means secured to said base for anchoring the bearing carried by the cantilevered end of said saw, to said base.

WILLIAM G. NORTON.